Figure 1:
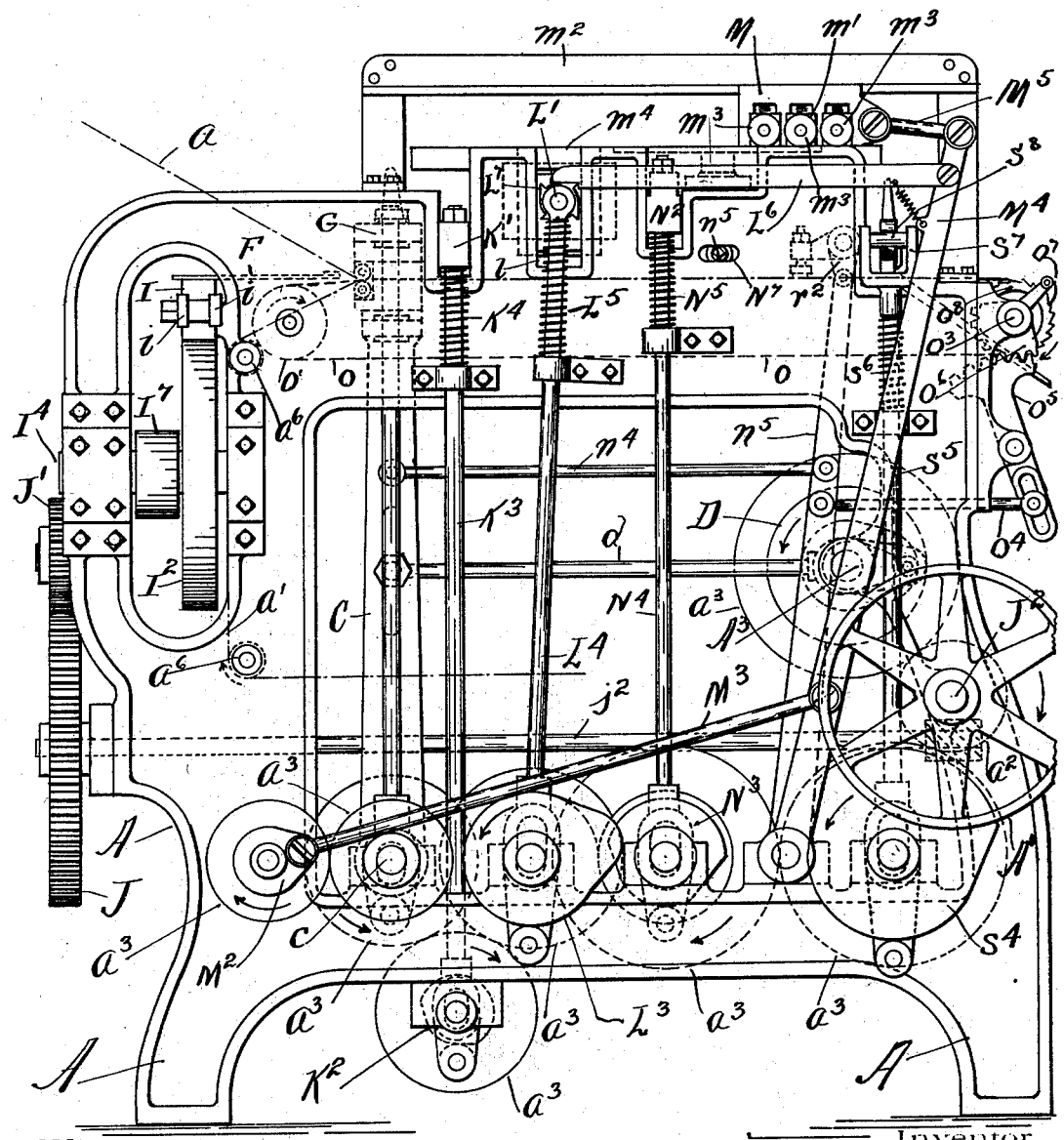

No. 752,601. PATENTED FEB. 16, 1904.
J. C. TAFT.
MACHINE FOR MAKING TAGS.
APPLICATION FILED MAR. 28, 1903.
NO MODEL. 8 SHEETS—SHEET 1.

Witnesses
Chas. P. Day.
H. H. Hay

Inventor.
Jerome C. Taft.
By Howard E. Barlow
Attorney.

No. 752,601. PATENTED FEB. 16, 1904.
J. C. TAFT.
MACHINE FOR MAKING TAGS.
APPLICATION FILED MAR. 28, 1903.
NO MODEL. 8 SHEETS—SHEET 2.

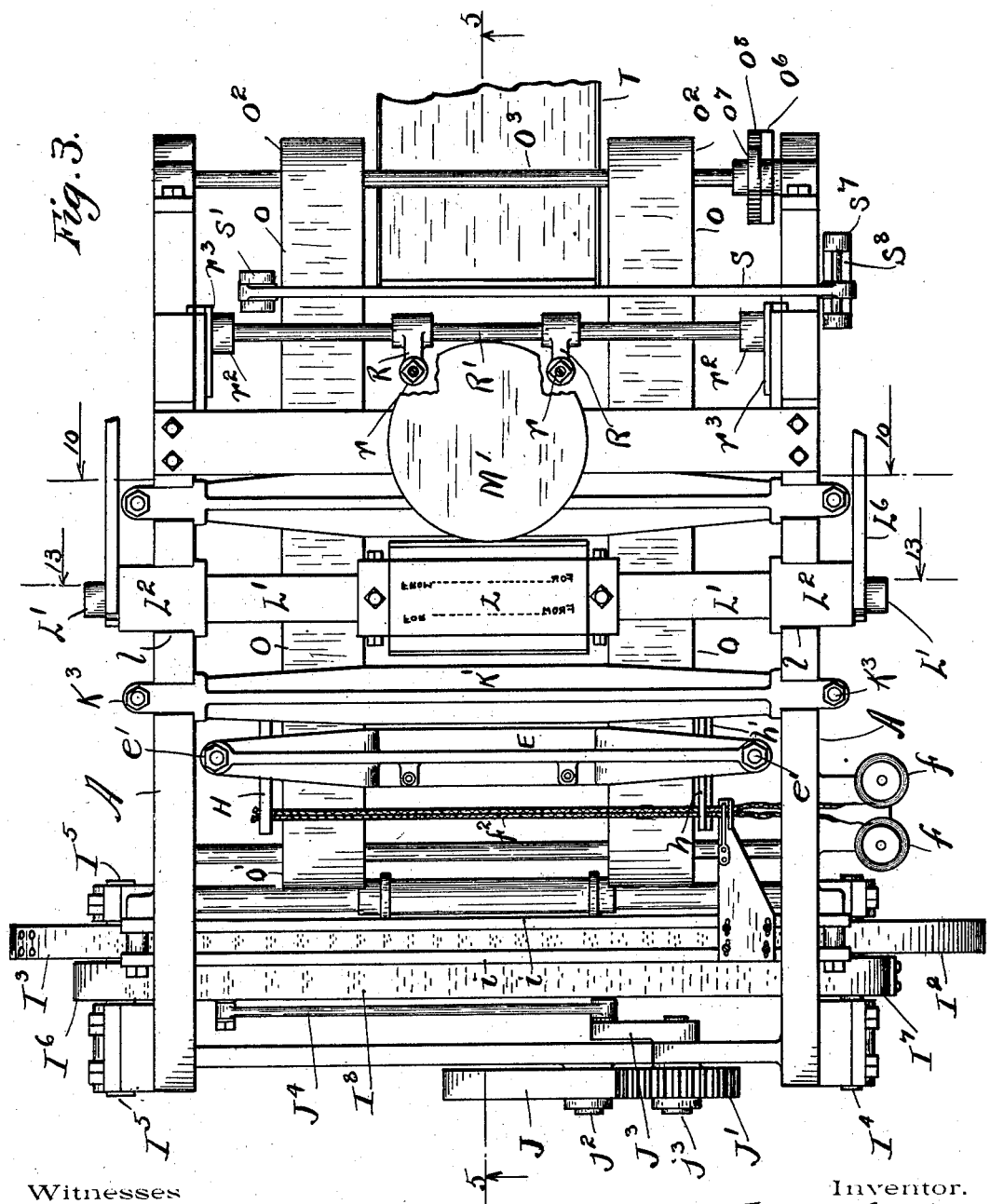

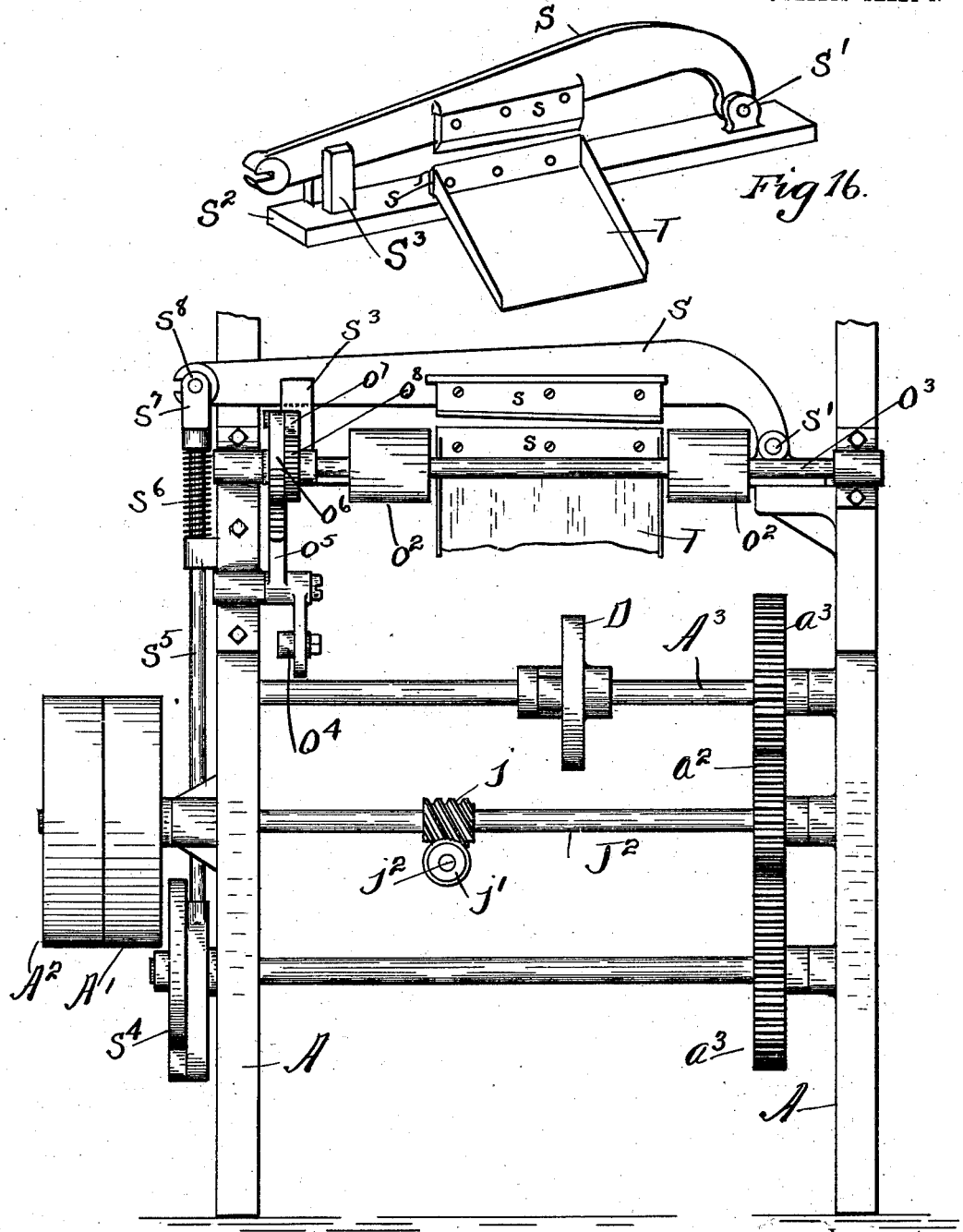

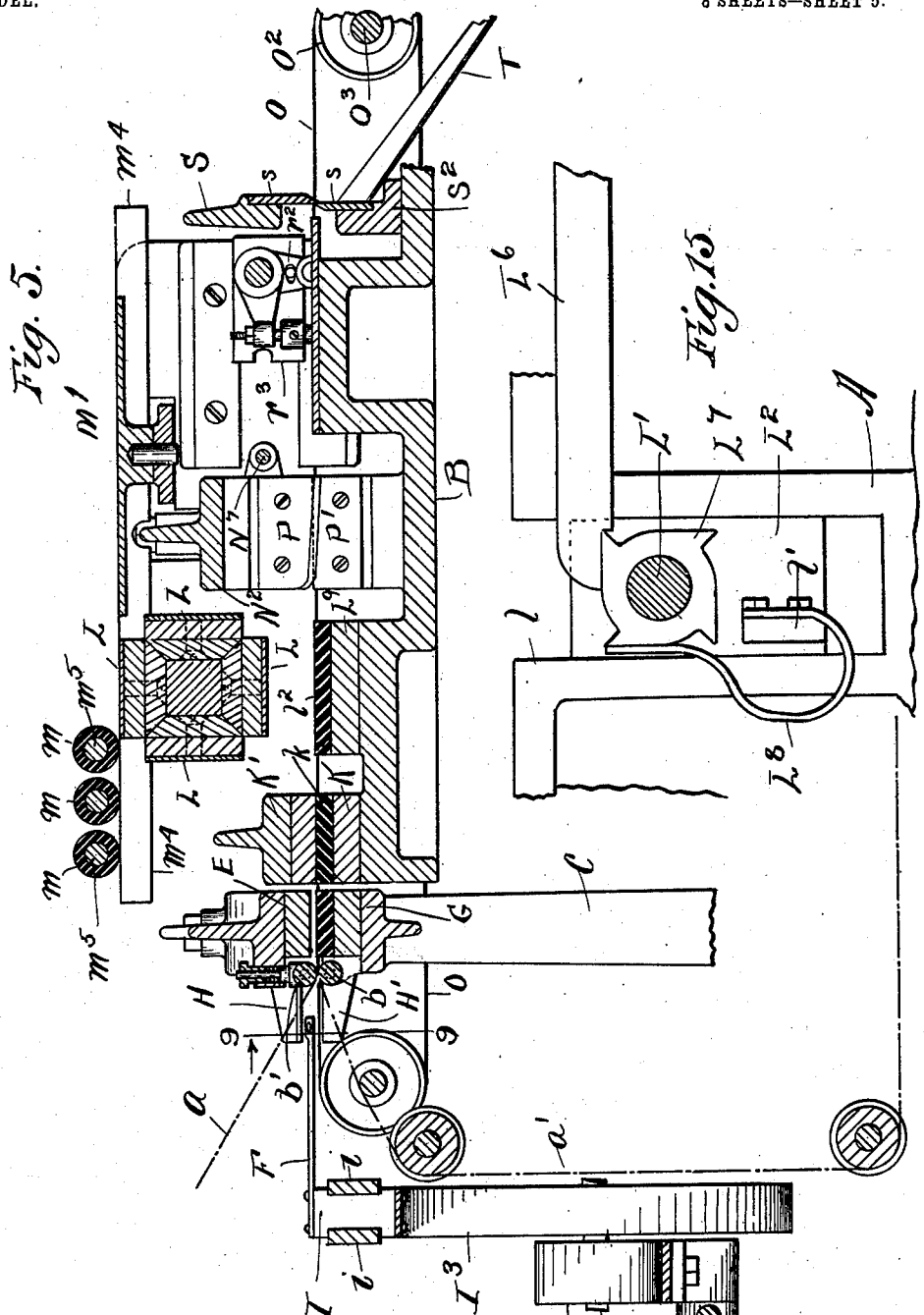

No. 752,601. PATENTED FEB. 16, 1904.
J. C. TAFT.
MACHINE FOR MAKING TAGS.
APPLICATION FILED MAR. 28, 1903.
NO MODEL. 8 SHEETS—SHEET 6.
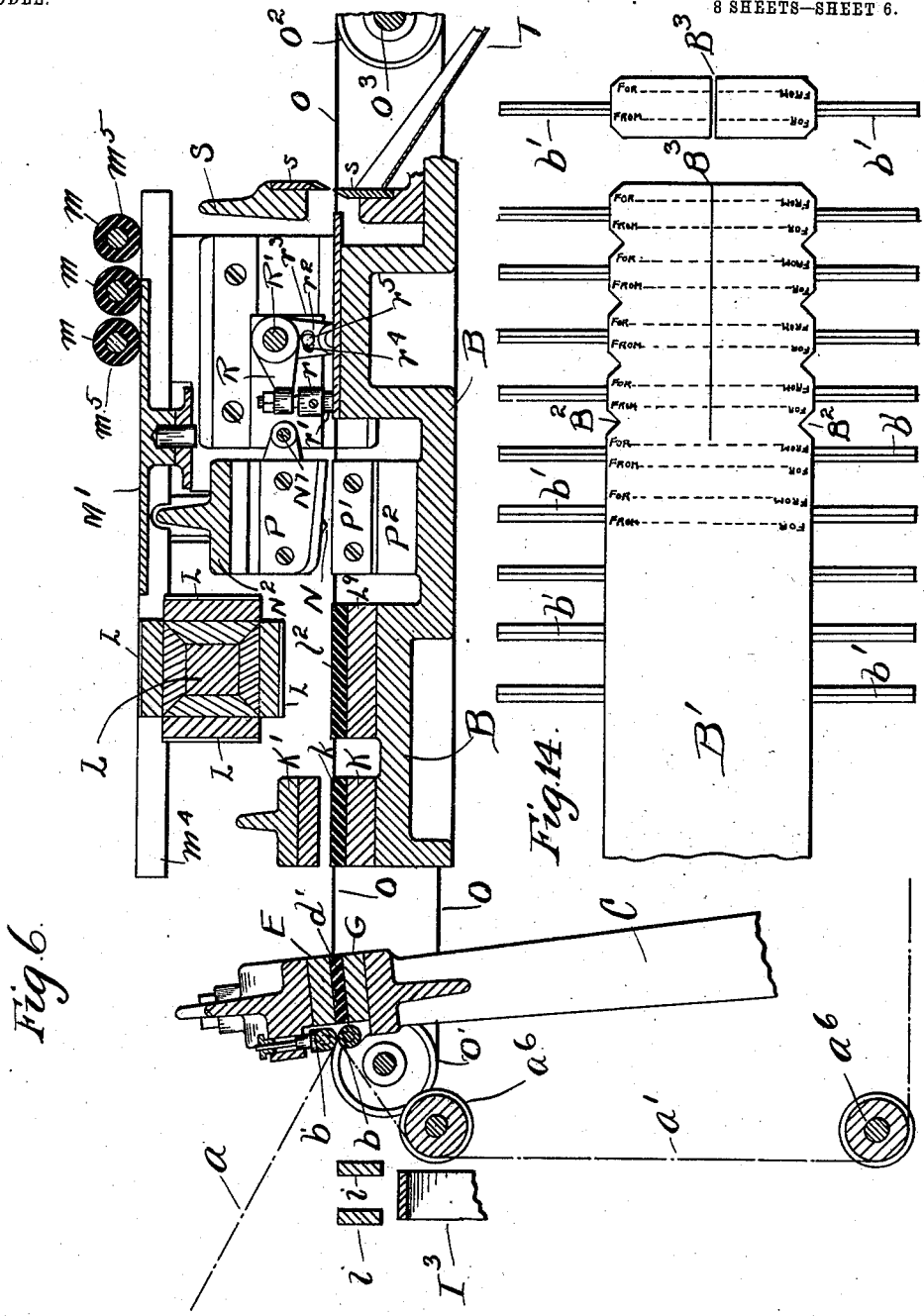
Witnesses
Chas. P. Day
H. S. K. Hay
Inventor.
Jerome C. Taft.
By Howard E. Barlow
Attorney.

No. 752,601. PATENTED FEB. 16, 1904.
J. C. TAFT.
MACHINE FOR MAKING TAGS.
APPLICATION FILED MAR. 28, 1903.
NO MODEL. 8 SHEETS—SHEET 7.
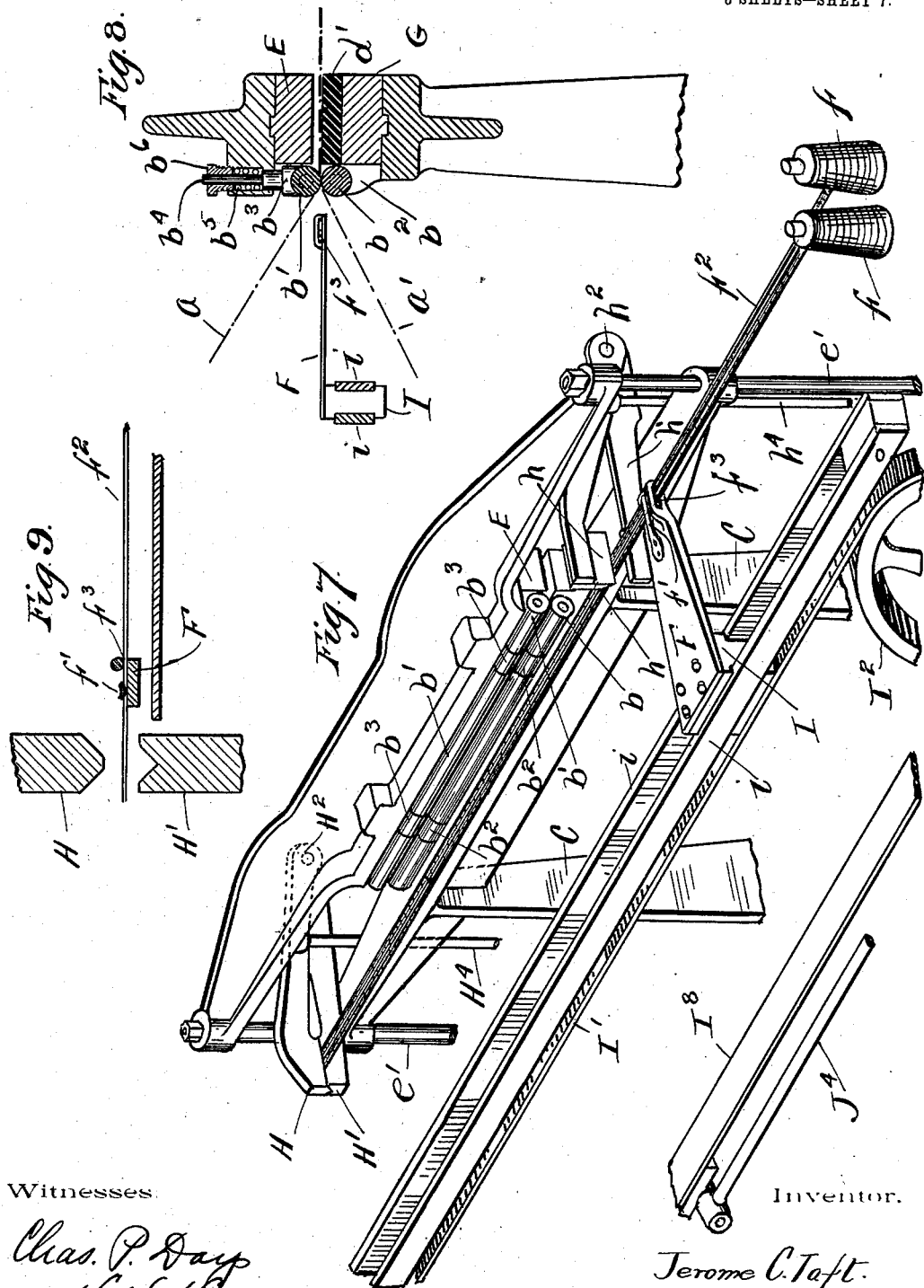
Witnesses
Chas. P. Day
S. H. Hay
Inventor.
Jerome C. Taft.
By Howard E. Barlow
Attorney.

No. 752,601. PATENTED FEB. 16, 1904.
J. C. TAFT.
MACHINE FOR MAKING TAGS.
APPLICATION FILED MAR. 28, 1903.
NO MODEL. 8 SHEETS—SHEET 8.
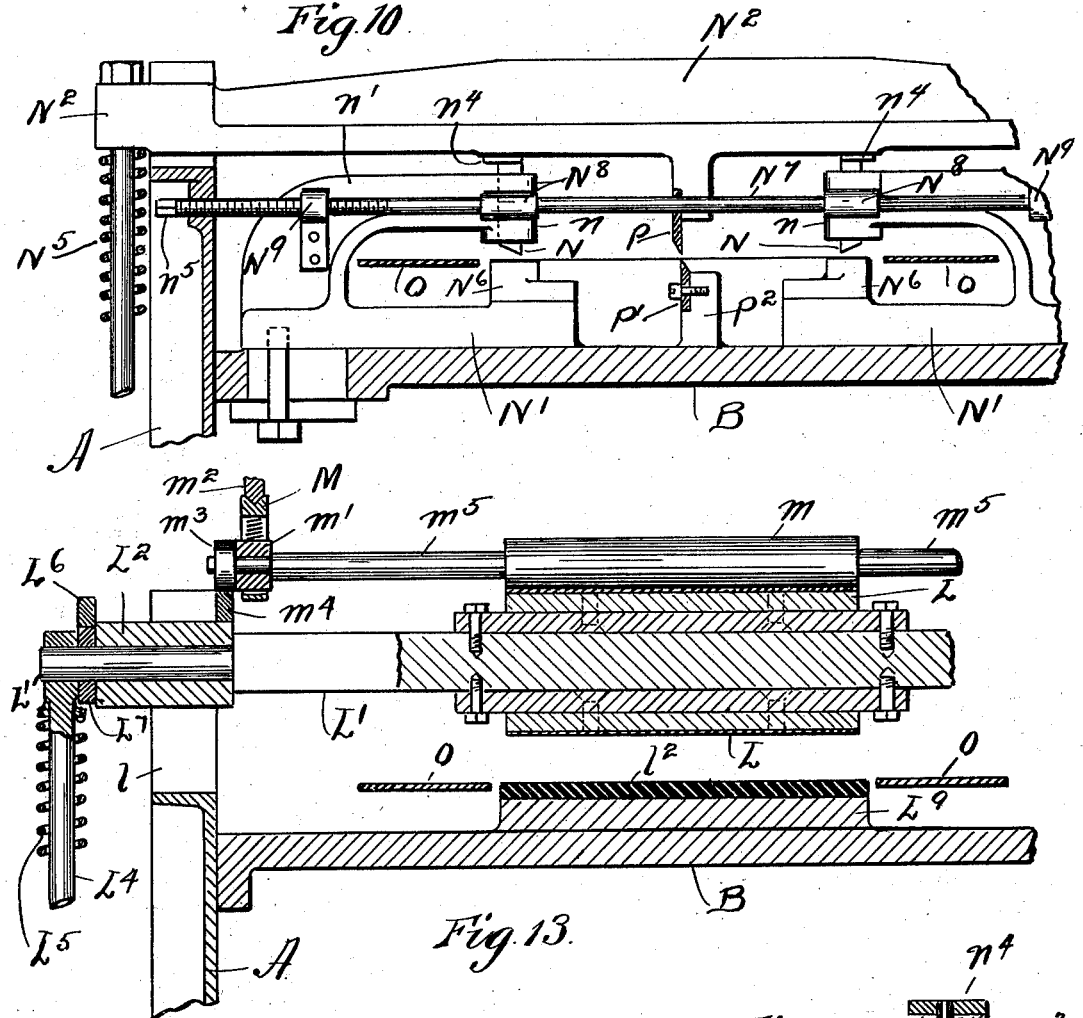
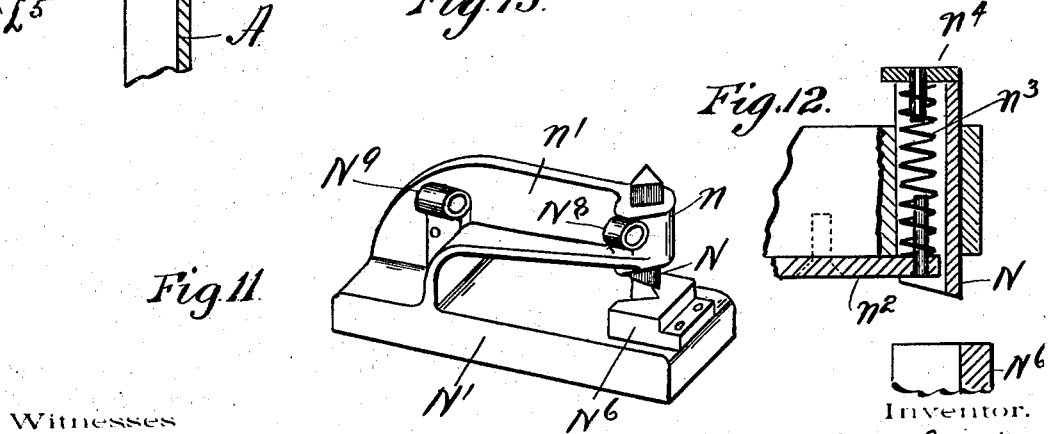
Witnesses
Chas. P. Day
Inventor.
Jerome C. Taft.
By Howard E. Barlow
Attorney.

No. 752,601. Patented February 16, 1904.

UNITED STATES PATENT OFFICE.

JEROME C. TAFT, OF PROVIDENCE, RHODE ISLAND.

MACHINE FOR MAKING TAGS.

SPECIFICATION forming part of Letters Patent No. 752,601, dated February 16, 1904.

Application filed March 28, 1903. Serial No. 149,988. (No model.)

*To all whom it may concern:*

Be it known that I, JEROME C. TAFT, of the city of Providence, in the county of Providence and State of Rhode Island, have invented certain new and useful Improvements in Machines for Making Tags; and I do hereby declare that the following is a full, clear, and exact description thereof, reference being had to the accompanying drawings, and to the letters of reference marked thereon, which form a part of this specification.

This invention relates to machines for making tags, and has for its object the production of apparatus for making rapidly, accurately, and cheaply merchandise and shipping tags, preferably from Manila paper or other strong and flexible material, and automatically printing on the same while passing through the machine, my invention being more particularly designed for the production of "string-tags," such as form the subject-matter of United States Patent No. 615,637, dated December 6, 1898. The tag shown in said patent is provided with a flexible strengthening member—such as a cord, string, tape, or wire—traversing it continuously from end to end between its opposite faces and at or near the longitudinal center of the tag-body, the end of the flexible fastener extending beyond one end of the tag to provide an attaching portion therefor.

In my machine the tags are made of two layers, sheets, or webs of paper or other suitable flexible material, which are cemented or otherwise secured together, the flexible strengthening-tape being securely cemented and firmly held in place between the two layers. These two sheets of material are fed from rolls, (not shown,) each in a continuous strip or web of a width double the length of the tag and brought into intimate contact with each other after the strengthener has been laid in position transversely to the length of the web by the action of drawing-in mechanism hereinafter more fully described. Means are provided for severing the strengthening-tape at the proper length after being drawn in. By the action of the mechanism the two webs are intermittently drawn in the required width of a tag, pressed together, printed, split apart, and notched out, and finally cut off of the double or two-fold web, forming two tags at each stroke as they pass from the machine.

This invention is fully explained in this specification and illustrated in the accompanying drawings.

Figure 2:
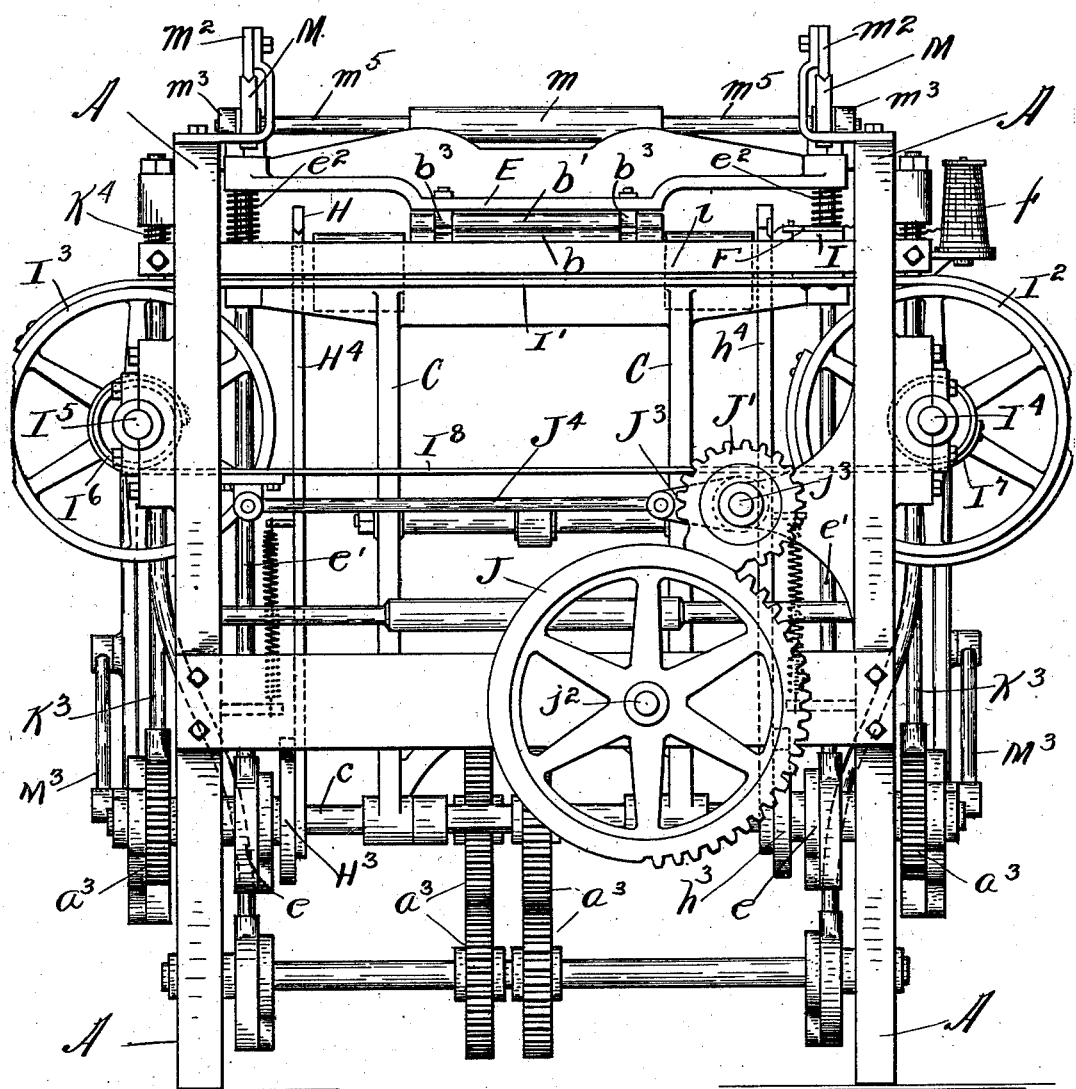

Figure 1 is a side elevation of the machine. Fig. 2 is front end elevation of the machine, illustrating intermittent gears as a means for drawing the traversing finger which threads in the tapes. Fig. 3 represents a plan view of the machine. Fig. 4 is a rear end elevation more particularly illustrating the knife which cuts off the tags as they reach the rear end of the machine. Fig. 5 is a longitudinal sectional elevation on the line 5 5 of Fig. 3, illustrating the reciprocating feeding-arm in its rearward position as having just fed a width of paper and the jaws having opened ready to return, the clamp-bar being down, the printing-block about to descend, the splitting-knife down, and the cut-off knife also down. Fig. 6 is a longitudinal sectional elevation the same as Fig. 5, also sectioned on line 5 5 of Fig. 3, but showing the working members in another position, the reciprocating feed-arm in its forward position clamping the two layers of paper into the strengthening-tape and ready to return and measure off the width of a tag, the clamping-bar open, the printing-block in its raised position after having just printed, the splitting-knife, the scoring-knife, and the cut-off knife all in their raised positions to allow the strip to be fed along by the reciprocating feed mechanism, which is located between the splitting and the cut-off knives. Fig. 7 is a perspective view illustrating the threading-in mechanism, the reciprocating measuring-clamp in the rearward position. The feeding-in finger after having carried the two tapes across the machine where the ends are gripped in the jaws has returned through the cut-off knives, holding the tapes taut, waiting for the measuring-clamp to come forward and roll down the paper webs (not shown) and subsequently cut off the tapes by the cutters, which are shown in their open position. Fig. 8 is an enlarged sectional elevation of the measuring-clamp, showing the feeding-in finger in position. Fig. 9 is an enlarged detail of the gripping-jaws and feeding-in finger sectioned on line 9 9 of Fig. 5, illustrating the finger as having carried the ends of the tape across the machine and presenting said ends to the gripping-jaws to be gripped and held while the finger travels back. Fig. 10 is a sectional view of the machine on line 10 10 of Fig. 3 looking in the direction of the arrow, illustrating the two adjustable notch-cutters and also the splitting-cutter in the center. Fig. 11 is a perspective view of one of the adjustable notch-cutters. Fig. 12 is an enlarged detail of the notching-cutter in section, illustrating the manner in which the cutter is held in the head and acted on by the spring to be returned after it has been pressed down by the reciprocating bar which passes over the top, as illustrated in Fig. 10. Fig. 13 represents a transverse section of the machine on line 13 13 of Fig. 3, showing the printing-block in section and the mechanism which operates it. Fig. 14 is a plan view of the double web-strip, illustrating the different steps in the operation of the machine which are required to produce the finished tag. They are as follows: first, the drawing in of the tapes and moving the webs along the width of a tag, then pressing the webs together, printing, notching, and splitting the web in the center, and finally cutting off the finished tags, making two at each stroke. Fig. 15 is a detail showing a side elevation of the mechanism which operates on the printing-block to rotate it one-quarter of a revolution at each reciprocation of the machine, so as to present the type to the ink-roll to be inked. Fig. 16 is a perspective view showing a detail of the cut-off knife at the rear end of the machine.

Referring to the drawings, A A are the side frames of the machine, and B is the table fixed to and supported between them.

C C are the supporting-arms of the oscillating or reciprocating measuring-clamp G, said arms being pivoted on the shaft $c$ at their lower ends and receive their motion from the cam D through the connecting-rod $d$. The face of the lower jaw of this clamp may be padded with rubber, felt, or any suitable material $d'$ to allow for the unevenness in the surface of the two webs when containing the tapes between them as they are pressed together. The upper jaw E of the clamp is arranged to be raised by the springs $e^2$ $e^2$ and closed by the cams $e$ $e$ at predetermined intervals through the connecting-rods $e'$ $e'$. (See Fig. 2.)

$b$ is a roller held to turn freely in bearings $b^2$ in the lower clamp-jaw. $b'$ is a corresponding roller held in bearings $b^3$ in the upper jaw, each of said latter bearings being held on a spindle $b^4$ to move endwise, a downward pressure being exerted by the spring $b^5$, the tension of which may be adjusted by the set-nut $b^6$. (See Fig. 8.) These rolls are always held in their closed position and in contact with the webs of material $a$ $a'$ to prevent said webs from opening up again after they have been pressed together by the closing of the jaws, which jaws are subsequently opened to return for another bite.

F is the finger for carrying the tapes $f^2$ from the spools $f$ $f$ across the machine. $f'$ is a flat spring fixed at one end to said finger, the tension of which being strong enough to hold the ends of the tapes which pass under it and draw said tapes from the spools as the finger moves across the machine. This finger F is mounted at one end on a guide-block I, which block slides back and forth across the machine in ways or guide-bars $i$ $i$, said bars being bolted to the frames A A at their ends. This block I is secured at its under side to the belt I', which belt is passed part way around and fastened at its end to the periphery of the two pulleys $I^2$ $I^3$, which are hung in bearings in the frames A A at each side of the machine. Fixed to the same shafts $I^4$ $I^5$ as the larger pulleys are the smaller pulleys $I^6$ and $I^7$. The belt $I^8$ passes part way around the smaller pulleys $I^6$ and $I^7$ in the reverse direction to that of belt I' and also has its ends fixed to the periphery of the pulley. This arrangement of belts and pulleys is for the purpose of transmitting the intermittent motion of the pinion J' through the crank $J^3$ and connecting-rod $J^4$ to the block I, and by the use of the small and large pulleys the stroke in the traverse motion is multiplied, so that with a comparatively short crank the finger may be carried way across the machine. This motion may be imparted to this block I through the belts by any suitable driving means, such as a cam carrying an arm connected to the belts, or by the intermittent gear J and pinion J'. (Shown in Fig. 2.) This gear receives a continuous motion from the shaft $J^2$ in the rear (see Fig. 4) through suitable bevel or spiral gears, as $j$ and $j''$, and shaft $j^2$. The continuous motion of this gear J imparts an intermittent motion to the pinion J' in the manner well known to those skilled in the art. The cut-off knives are so arranged with reference to the stroke of the tape-carrying knives that said tapes $f^2$ are cut off, leaving their ends extending out a short distance beyond the edge of said finger F, as illustrated in Fig. 9, which illustration also represents the tapes $f^2$ as passing through the eye $f^3$ of the finger F under the spring $f'$ (by the tension of which spring they are held) and extending out between the clamping-jaws H H', the purpose of these jaws being to bite the ends of the tapes $f^2$ and hold them firmly while the traversing finger F returns across the machine, passing between and a short distance beyond the cut-off knives $h$ $h'$. The cut-off knives are actuated to cut off the tapes at the proper time and length after the measuring-clamp G has come forward and pressed the two webs $a$ and $a'$ together onto the tightly-drawn tapes $f^2$. The lower jaw $h'$ of the cutter is held rigidly to the frame A, while the upper jaw $h$ is pivoted at $h^2$ and is actuated at predetermined intervals by the cam $h^3$ through the connecting-rod $h^4$. (See Fig. 2.) The clamping-jaws H H' are operated independent of but in much the same way as the cutters, the jaw H' being held stationary to the frame, while the upper jaw H is pivoted at $H^2$ and receives its motion at predetermined intervals by the cam $H^3$ through the connection $H^4$. The next operation after the tapes $f^2$ have been pressed in between the double webs $a$ and $a'$ and brought back the width of a tag by the measuring-clamp G is to again press the webs tightly together by the press-clamp K, by which the webs are held while the measuring-clamp G returns for another bite. In this clamp K the lower jaw is held stationary and is supported on the table B. It is padded on its face at $k$ by rubber or other suitable flexible material. The upper jaw K' is drawn down at predetermined intervals by cams $K^2$, suitably located on the frame A A on either side of the machine, through the connecting-rods $K^3$ $K^3$, and raised by the open spiral springs $K^4$, the ends of this reciprocating bar being guided in slots in the frames, as shown in Fig. 1.

I preferably do the printing by the use of electrotypes which are made up in blocks L L, the faces of which contain the desired type and are secured by any suitable means, such as clamps, screws, or bolts, to the square shaft L', which shaft reaches across the machine from side to side and is journaled in the boxes $L^2$ $L^2$. These boxes are held to slide up and down in suitable slots $l$ $l$ in the frame A A and the shaft being drawn down at predetermined intervals by the cams $L^3$, which are suitably located in the frame on either side of the machine, (see Fig. 1,) through the connecting-rods $L^4$ and are allowed by the cams to be raised again by the action of the open spiral springs $L^5$.

To facilitate the inking of the face of the type, which is necessary for each impression, I attach four blocks to the shaft and revolve the shaft one-quarter of a revolution after each impression. This is done by the action of the reciprocating bar $L^6$, (see Figs. 1 and 15,) one end of which engages the star-wheel $L^7$, turning it nearly one-quarter of a revolution at each stroke. The motion of this bar is received from the lever $M^4$, which latter will be hereinafter more fully described. The turning of this star-wheel $L^7$ compresses the flat spring $L^8$, one end of which is secured to a lug $l'$ in the moving box, (see Fig. 15,) so that when the star-wheel is nearly over the spring, acting against the flat face of the star-wheel, will carry it the rest of the way and hold it squarely in place. A block $L^9$, with a flexible face $l^2$, serves to support the material while being printed upon.

The ink-rolls $m$ $m$ $m$ are journaled in vertically-adjustable bearings $m'$, held in a reciprocating block M, (see Fig. 1,) which block slides back and forth in guides $m^2$, made to receive them. On each end of the ink-roll shafts $m^5$ are wheels or rollers $m^3$, which are the diameter of the rolls $m$ and run on tracks $m^4$, being carried back and forth over an ordinary ink-plate M' and over the face of each type-block L as one is presented at each stroke in the manner described above after it has made its impression on the face of the material. These rolls are driven by the crank $M^2$ through the connecting-rod $M^3$, lever $M^4$, and short connecting-rod $M^5$.

The next operation after printing is to move the webs along to the V-shaped cutters N N, that notch the edges at $B^2$ $B^2$ and split the web in the center at $B^3$, the effect of which operation is best illustrated in Fig. 14 and the mechanism in Figs. 10, 11, and 12. The notching-cutters N N are mounted so as to be vertically movable in the head $n$ of an overhanging arm $n'$ of the frame N' N', which are located on each side of the web and are capable of being adjusted both laterally and longitudinally to accommodate different sizes of tags. These cutters N are made in a V shape in cross-section, having a hollow center. (See Fig. 12). A plate $n^2$ projects into the center and supports the lower end of an open spiral spring $n^3$, which serves to raise the cutter N by pressing against the cap $n^4$ across its top after it has been depressed to cut the notch from the material by the cross-bar $N^2$. This cross-bar is drawn down at predetermined intervals by the cam $N^3$ through the connecting-rod $N^4$, and is raised again by the action of the open spiral spring $N^5$.

$N^6$ is the cutter-block or die, into which the cutter slides as it goes through the material. The cutters have to be adjusted for each different size of tags to be made, and as it is necessary to have the lower cutter-block or die in perfect line with the moving cutter it is found advisable to have them both connected together in the same frame. In order to do this, the frame is obliged to have the long overhanging arm $n'$ so as to pass around and clear of the tape-carrying belts O, hereinafter more fully described. For the purpose of adjusting the cutter-blocks transversely—that is, to draw them together or apart—to accommodate a wider or narrower web I pass the shaft $N^7$, which is threaded on its ends, through the fixed guide-bearings $N^8$ and through the threaded blocks $N^9$, which blocks are also secured to the frame. The end of this shaft $N^7$ is squared at $n^5$ and projects through the frame A for the purpose of receiving a wrench, (not shown,) by which it can be turned and the cutters N nicely adjusted.

P and P' are knife-blades for the purpose of splitting the webs. The upper blade P is fixed to and moves with the reciprocating bar N², while the lower knife P' is fixed to a lug P² on the table B. The web passes between them and is split in two.

To assist in drawing the web B' through the machine, I employ a supplementary reciprocating feed attachment, in which $r$ $r$ are the fingers adjustably held in the arms R R. Set into the ends of these fingers $r$ are flexible tips $r'$, preferably of rubber, which are pressed onto and adhere to the web to assist in drawing said web along at the proper time. When the fingers return for another nip, they are raised from the surface of the web by mechanism hereinafter described. The arms R are mounted on and fixed to the shaft R'. This shaft reaches across the machine and is journaled at its ends in sliding plates $r^3$ $r^3$. Pins $r^5$ $r^5$ are fixed in the plates $r^3$ $r^3$ and project into slotted holes $r^4$ $r^4$ in the depending arms. The reciprocating motion of this mechanism is transmitted through this depending arm $r^2$, and therefore by slotting the hole $r^4$ in the arm the slight lost motion thus caused allows the arm $r^2$ to swing forward slightly until it brings up on the pin $r^5$, thereby turning the shaft R' and raising the friction-fingers $r$ before the rest of the mechanism starts forward on its return stroke. Another reason for slotting the holes is when the motion is reversed it insures the friction-fingers coming down in contact with the web before the rest of the mechanism can start back. This feeding mechanism receives its motion from the reciprocating arm C of the feed-clamp, one on each side of the machine, through the connecting-rods $n^4$ and the swinging levers $n^5$. This lever $n^5$ is pivoted at its lower end to the frame and pivotally connected at its upper end to the depending arm $r^2$, through which arm motion is transmitted to the feeding mechanism.

The last operation of this machine is to cut off the end of the web B' between the tapes $b'$, and as the web has previously been split at B³ two finished tags are formed at each cut of the knife. The operation of this cut-off knife is best illustrated in Figs. 4 and 16, in which S represents the reciprocating knife-bar, pivoted at one end S' to the lower bar S². Blades $s$ $s$ are fastened to both the reciprocating and lower bars. The outer end of the reciprocating bar works up and down in the space between the guide-lugs S³. This knife-bar receives its downward motion at predetermined intervals by the cam S⁴ through the connecting-rod S⁵, which is connected at its upper end to the outer end of said bar. This bar after being drawn down by the cam is raised by the action of the open spiral spring S⁶. Fixed on the end of the connecting-rod S⁵ is the U-shaped head S⁷, (see Fig. 1,) containing a pin S⁸, which extends across the space and and has bearings in the outer ends of the arms. This pin engages the slotted end of the knife-bar S. This means of connecting to the knife-bar is to allow said bar to be moved lengthwise of the machine to accommodate itself to different sizes of tags to be cut. The inclined chute T is for the purpose of catching the tags when severed from the web or strip and convey them from the machine to a suitable receptacle placed below to receive them.

Carrier-belts O O are arranged on either side of the web B' to carry that portion of the tapes $b'$ which project beyond the edges of said web. These belts O O run over pulleys O' O' in the front of the machine and pulleys O² O² in the rear of the machine. Said rear pulleys O² O² are mounted on and fixed to a shaft O³, which extends across the machine and has its bearings in the frames A A on either side. (See Fig. 4.) This shaft receives its motion from the reciprocating lever $n^5$ through the connecting-rod O⁴ (see Fig. 1) and segment-gears O⁵ and O⁶. The segment O⁶ being loosely mounted on said shaft O³ operates the pawl O⁷ to impart an intermittent rotary motion in one direction to the pulleys O² O² through the ratchet-wheel O⁸, which is fixed to said shaft O³.

The operation of the machine is further explained as follows: The power is applied by belts (not shown) to the pulleys A', fixed to the main shaft J². A² is the loose pulley on the end of said shaft. (See Figs. 1 and 4.) Fixed on the shaft J² is the pinion $a^2$, which transmits the motion to the cam-shaft A³ through the gear $a^3$. This pinion $a^2$ also transmits motion through a train of gears to all of the moving parts, said train being best shown in Fig. 1, where it is seen that some of these gears $a^3$ $a^3$ are placed outside of the frame A and some inside of the frame, as found desirable in the construction of the machine. The material may come to the machine in any suitable way; but I show the lower layer or ribbon $a'$ as coming from underneath the machine, (see Figs. 1 and 6,) being drawn from a roll in the rear. (Not shown.) Leading the material in this manner the glued surface is not brought in contact with the leading rolls $a^6$ $a^6$. The upper layer of material $a$ is also led from a roll, not shown, but suitably located above the machine. The reason for holding the layers $a$ and $a'$ well apart as they enter the machine is to allow the finger F room to work back and forth in drawing in the tapes.

The glue or cement may be applied to the inner face of either or both of the strips or ribbons of material while they are being drawn into the machine, or either or both of said strips may be previously prepared and dried and then moistened by mechanism (not shown) in any suitable manner. So, too, a greater or less number of strands or tapes than I have herein shown may be used to compose each fastener.

My method of holding the tapes taut and bringing a clamp forward to press the strips of material onto the tapes while thus held is a very important feature, as by this method the tapes have absolutely no chance to move before they are firmly secured in the proper position between the cemented webs. This insures them being laid perfectly straight, flat, and equally distant from each other, which is not the case with the methods heretofore employed where the tapes were drawn in, cut off, and released, to be carried along loosely on the surface of the lower strip to be subsequently rolled in between the layers of material.

This machine is so constructed that all of the parts which come in contact with or operate on the webs may be adjusted, if desired, both longitudinally and laterally where it is found necessary in order to operate on and produce tags of different dimensions; but my invention is not restricted to the precise construction and arrangements of parts herein shown and described nor to the various details thereof, as the same may be modified or rearranged in various particulars without departing from the spirit and scope of my invention, one practical embodiment of which has been herein illustrated and described without attempting to show all of the various forms and modifications in which my invention might be embodied.

Having thus described my invention, what I claim as new, and desire to secure by Letters Patent, is—

1. In an apparatus of the character described in combination a reciprocating feed-clamp for feeding longitudinally and laying and pressing together two strips or ribbons of material having cemented surfaces, means in said clamp to keep the web from opening up after having been pressed together by said clamp, mechanism for drawing in the tapes or strengtheners transversely to and between said strips at predetermined intervals, means to sever the double strips transversely between the series of strengtheners, substantially as described.

2. In an apparatus of the character described, in combination, a reciprocating clamp for feeding and pressing two strips or ribbons of material having cemented surfaces, means for drawing in flexible tapes or strengtheners transversely to and between said strips of material at predetermined intervals, means for holding said tapes taut while said reciprocating clamp moves forward and presses said strips of material onto said tapes, means for reciprocating said clamp and means for severing the double strip between the series of tapes, substantially as described.

3. In an apparatus of the character described in combination, means for drawing in flexible tapes or strengtheners at predetermined intervals between and transversely to two strips or webs of material having cemented surfaces, means for holding said tapes taut while said webs are pressed upon them, a reciprocating clamp to move forward and grip and press the two webs or strips of material together onto said tightly-held tapes, said tapes to be subsequently released and the webs moved along by the movement of the reciprocating clamps, means for reciprocating said clamp and means for severing the double strips between the series of tapes, substantially as described.

4. In an apparatus of the character described, in combination, mechanism for drawing in tapes or strengtheners at predetermined intervals between and transversely to two strips or webs of material having cemented surfaces and holding said tapes taut while said webs are being pressed upon them, a reciprocating feed-clamp containing means for laying said strips or webs by first rolling and then pressing them together over said tightly-drawn tapes, means for severing the double strips transversely between the series of strengtheners, substantially as described.

5. In an apparatus of the character described in combination, means for drawing in flexible tapes or strengtheners at predetermined intervals between and transversely to two strips or webs of material having cemented surfaces, means for holding said tapes taut, a feed-clamp held to reciprocate longitudinally of the machine, said clamp containing a pair of rolls to keep the webs from opening up after being pressed together by the clamps, a vertically-reciprocating bar forming the upper jaw of said clamp for pressing said webs together onto said tightly-drawn strengthener and holding the webs tightly together while the clamp moves back the width of a tag carrying the tapes secured between the webs, means for vertically reciprocating the feed-clamp, substantially as described.

6. In an apparatus of the character described, in combination a reciprocating feed-clamp for feeding longitudinally and laying and pressing together two strips or ribbons of material having cemented surfaces, mechanism for drawing in the tapes or strengtheners transversely to and between said strips at predetermined intervals and holding said tapes taut while they are pressed in between said strips of material, a finger for carrying the ends of the tapes across the machine, clamps for holding the ends of said tapes while said finger travels back to the opposite side of the machine and means for severing and simultaneously releasing said tapes after said strips or webs are pressed upon and cemented to said tapes, means for imparting said traverse motion to said finger, substantially as described.

7. In an apparatus of the character described in combination, a feed-clamp held to reciprocate longitudinally in the machine, said clamp containing a pair of rolls to keep the webs from opening up after having been pressed together by said clamp, a vertically-reciprocating cross-bar forming the upper jaw of said clamp for pressing said webs together onto said tightly-drawn strengthener-tapes and holding said webs tightly together while the clamps moved back the width of a tag carrying the tapes secured between the webs, means for vertically reciprocating the upper jaw and means for longitudinally reciprocating the feed-clamp, a finger for carrying the ends of the tapes transversely across the machine, clamps for holding the ends of said tapes while said finger travels back to the opposite side of the machine and means for severing and simultaneously releasing said tapes after said strips or webs are pressed upon and cemented to said tapes, means for imparting an intermittent traverse motion to said finger, substantially as described.

8. In an apparatus of the class described in combination, mechanism for drawing in tapes or strengtheners at predetermined intervals between and transversely to two strips or webs of material having cemented surfaces and holding them taut, a reciprocating feed-clamp containing means for laying said strips or webs by first rolling and then pressing them together over said tightly-drawn tapes, an auxiliary pressing-clamp, means for splitting the double web longitudinally through the center, means for severing the double strips transversely between the series of strengtheners, thus producing two tags at each operation, substantially as described.

9. In an apparatus of the class described in combination, means for drawing in flexible tapes or strengtheners at predetermined intervals between and transversely to two strips or webs of material furnished with cement, means for holding said tapes taut while said webs are pressed upon them, a reciprocating clamp to move forward and grip and press the two webs or strips of material together onto said tightly-held tapes, said tapes to be subsequently released and the webs moved along by the movement of the reciprocating clamps, means for reciprocating said clamp, an auxiliary pressing-clamp, means for splitting the webs longitudinally through the center, and means for severing the double strips between the series of tapes thus producing two finished tags at each stroke, substantially as described.

10. In an apparatus of the character described in combination a reciprocating feed-clamp for feeding longitudinally and laying and pressing together two strips or ribbons of material having cemented surfaces, a finger mounted to slide in guide-bars for carrying the ends of the tapes transversely across the machine, clamps at one side of the machine for catching and holding the ends of said tapes while said finger travels back to the opposite side of the machine, and means for severing and simultaneously releasing said tapes after said strips or webs are pressed upon and cemented to said tapes, means for imparting an intermittent traverse motion, means for multiplying the stroke of the intermittent mechanism to carry said finger across the machine.

11. In a machine for making tags, in combination, means for drawing in flexible tapes or strengtheners at predetermined intervals between and transversely to two strips or webs of material each having a cemented surface, said tapes projecting a short distance beyond each edge of the web, means for holding said tapes taut while said reciprocating clamp moves forward and presses said strips of material onto said tapes, means for reciprocating said clamp and means for subsequently pressing, splitting longitudinally through the center, and notching each edge of said webs midway between the tapes, and means for severing the double strip between the series of tapes at the apex of said notches forming two complete tags at each stroke, substantially as described.

In testimony whereof I have hereunto set my hand this 25th day of March, A. D. 1903.

JEROME C. TAFT.

In presence of—
HOWARD E. BARLOW,
CHAS. P. DAY.